UNITED STATES PATENT OFFICE.

ROBERT D. PIKE, OF SAN FRANCISCO, CALIFORNIA.

CARBON AND METHOD OF RECOVERING SAME FROM THE WASTE PRODUCT OF OIL-CRACKING.

1,285,363.     Specification of Letters Patent.     Patented Nov. 19, 1918.

No Drawing.     Application filed July 25, 1916. Serial No. 111,165.

*To all whom it may concern:*

Be it known that I, ROBERT D. PIKE, a citizen of the United States, residing at the city and county of San Francisco and State of California, have invented certain new and useful Improvements in Carbon and Methods of Recovering Same from the Waste Product of Oil-Cracking, of which the following is a specification.

The present invention relates to the recovery of the so-called "lamp-black" carbonaceous waste by-product of oil gas manufacture for the production of substantially pure powdered carbon for use in the industrial arts, as, for instance, the manufacture therefrom of light carbons, carbons for use in connection with projecting machines, and electrodes generally, the object being the utilization of that which at present is practically a worthless product for the production therefrom of a valuable product for use commercially.

While there are various methods of cracking oils in use at the present time, consideration need only be given to the methods employed in connection with the manufacture of gas from oil, for it is the waste by-product from such cracking of oils which is utilized in my method for the recovery therefrom of substantially a pure form of carbon for use in the electrical and other arts where an almost chemically pure form of carbon is demanded.

In the cracking of oils for the manufacture of illuminating gas from oil as at present carried out, consideration is only had for the main product, namely, illuminating gas, and the waste carbonaceous material or by-product of such manufacture and which is a mixture of a powdered form of carbon and tar in varying proportions colloquially known as refuse "lamp-black", although bearing no resemblance to real lamp black, is looked upon as an objectionable waste, useful only as fuel. In the manufacture of such illuminating gas, the oil, and steam intimately mixed and in proper portions to give the desired gas analysis, are sprayed in an inclosed space upon brick checkerwork previously heated to a temperature of approximately 2000 degrees Fahr. to produce the desired cracking reaction at the given pressure, which is usually around atmospheric. The mixed steam and oil rush through the heated brick checkerwork at a high velocity and the hydro-carbon molecules in the oil are re-arranged or "cracked," forming illuminating gas and carbonaceous decomposition products, composed of a powdered form of carbon and tar. After passing from the checkerwork, the gas, which is then at a temperature of about 1800 degrees Fahr., is plunged into cold quenching water. This separates out practically all of the powdered carbon which has been carried in suspension by the quickly moving gases and some of the tar, and the carbonaceous material recovered at this point is what is known colloquially as refuse "lamp black", although bearing no real resemblance to true lamp black, which, as is well known, is, as produced from smoky flame, practically pure carbon of a soft velvety texture, deep black in color and weighing about .3 oz. per cu. in., while this co-called refuse "lamp black" which constitutes the refuse from the oil cracking, contains about 50% materials other than carbon, is gritty in texture, gray instead of black in color, and weighs about .42 oz. per cu. in. and also displays different and distinctive properties when made into certain forms of carbon products for electrical purposes, as, for example, carbon electrodes used for arc lamps, projector machines, searchlights, etc.

In short, complete observation of the so-called refuse "lamp black" itself as well as extensive commercial use of carbon electrodes comprising its use in their manufacture after it has been treated in accordance with my process, have proven it to be a separate and distinct form of amorphous carbon, as different from either true lamp black or coke, as these in their turn are different from each other. For the purpose of clearness and to do away with confusion of terms, reference shall be made to the refuse "lamp black" as the carbonaceous by-product of the cracking reaction or briefly the carbonaceous by-product.

As produced, the carbonaceous waste by-product, owing to the presence of impurities, is useless except as a fuel, and has a value of about $3.00 per ton.

The so-called "lamp black" carbonaceous by-product refuse of the cracking reaction of oil as produced by the manufacture of illuminating gas from oil, contains about the following per hundred lbs.

| | |
|---|---|
| Soluble ash | 2½ lbs. |
| Insoluble ash | ½ " |
| Tar | 15–30 " |
| Water | 30 " |
| Hydro-carbon volatile at low temperature | 10 " |
| Amorphous carbon | 27–42 " |

The soluble ash is introduced in the water used for quenching the heated gases after leaving the checker-work, and the preferable way for eliminating this impurity is by the use of pure quenching water. This can be done even if pure water is costly, by using the same water over and over again, passing it through a cooling apparatus after each contact with the hot gases to extract the heat and supplying the losses.

The insoluble ash, is composed principally of iron, silica and alumina, and is due to the presence of these substances in the original oil. It can be eliminated by filtering the original oil by any suitable method or else by using as original oil a distillate which will of course contain no solid impurities.

The so-called tar, contained in the carbonaceous by-product, is largely dependent upon the temperature of the cracking reaction. In general, the higher this temperature the less tar will be obtained. All of the tar produced in the cracking reaction is not found in the carbonaceous by-product precipitated in the quenching waters, but the larger portion of it is recovered in the so-called scrubbing towers through which the gases pass after leaving the quenching water. The presence of the amount of tar mentioned in the carbonaceous by-product is not in itself objectionable in most cases in the carrying out of my process, but when a finished product is desired as free from gritty particles as possible, it can be removed as hereinafter described.

For production of the highest grade of carbon, the original oil should either be filtered clear of solid impurities or else a distillate should be used, but if care be exercised in the selection of a crude oil with not too great an amount of solid impurities, a final carbon can be produced, which while not as valuable as that made when using an original oil free from solid impurities, is still one having a considerable commercial value. However, inasmuch as the cost is not much increased by use of an oil free from solid impurities, it is far preferable that such should be used, although a distillate is preferable over filtered oil, because the former usually contains less sulfur than the latter and a certain proportion of the sulfur in the original oil is always discovered in the carbonaceous by-product, but in the actual carrying out of gas manufacture in which California petroleums were used as original oils, sulfur contents are not present in an amount to be objectionable, and, therefore, no mention has been made thereto as one of the substances found in the carbonaceous by-product.

In following the steps employed for the manufacture of gas from oil or other oil cracking process, consideration being had for the proper production of the main product, the quenching water carrying in suspension the carbonaceous by-product is run through any suitable filtering device. The water, if too valuable to waste, is then cooled and re-used again for quenching. The carbonaceous by-product is then either allowed to drain free from most of the water remaining in it, or is run directly through any suitable drier which drives off most of the water and a considerable portion of the volatile hydro-carbon, leaving a fairly dry carbonaceous material containing about ten per cent. volatile matter.

The treatment of the carbonaceous by-product from this point may be varied slightly according to the use to which the carbon is to be finally put. If it is to be manufactured into carbon electrodes, it can be charged directly into fire clay retorts where it is heated to incandescence for a period long enough to drive off all volatile matter, usually from 18 to 48 hours according to the size of the retort. After this treatment, it is cooled and ground to a suitable mesh. By such treatment a large proportion of the product is found to be an almost impalpable powder, while the balance is coarse enough to be classified as to size of grain. While this is an advantage in the manufacture of carbon electrodes for arc lights, still if the carbon is to be used for filling dry batteries the presence of such a large portion of impalpable powder is a distinct disadvantage. To overcome this disadvantage, the carbonaceous material, after being drained free from most of the water contained in it, or after having been run through the drier, is mixed in any suitable mixing machine with a suitable quantity of the by-product tar recovered from the scrubbing towers, the resulting mass being either charged directly into the fire clay retort or else formed into blocks or briquets and then charged into the fire clay retorts, where it is treated as formerly described, then cooled and ground to suitable mesh. By thus admixing the tar with the recovered carbonaceous material, the particles making up that portion referred to as impalpable powder as well as all other particles, are agglomerated and when subjected to the heat in the fire clay retort the whole forms a solid cokelike mass, which when ground through any suitable grinding machine yields particles of fairly uniform size.

Instead of the by-product tar recovered from the scrubbing towers, any other suitable carbonaceous binding material could be used, but the use of the former is preferable, inasmuch as it is easily available in suitable quantities and is known to be at least as free from solid impurities as the carbonaceous by-product itself.

In the event of the use of an impure quenching water, the soluble impurities must be removed. This is accomplished in the following manner:—The carbonaceous by-product after having had the bulk of the quenching water removed from it, is subjected to milling, in what is known ordinarily as a chaser mill or wet pan with the admixture of sufficient hot water to make a gruel-like mass. This process causes most of the tar contained in the carbonaceous by-product to agglomerate into flakes and pellets, which are then removed by washing the whole mass with water through a screen of suitable mesh, usually about 8 to the inch. This results in the separation of the carbonaceous by-product into two portions, one portion containing 70% to 90% of the whole, being in the form of a finely divided carbon, and the remainder being in pellets and flakes about the size of a pea or a ten cent piece and composed largely of tar. Both portions are now in such form that their soluble contents can be removed by repeated washing with water in any suitable apparatus for this purpose, while before separation this could not be easily done, owing to the general admixture of tar preventing the solvent action of the water. After washing, the two portions can either be mixed or else treated separately by the same operations formerly described as applying to the carbonaceous material when treated with pure quenching water.

The carbon produced by this process is a gray substance containing about 99½% carbon and is of great value in commerce, particularly in the electrical arts.

Having thus described my invention, what I claim as new and desire to protect by Letters Patent is:—

1. The method of recovering the so-called "lamp black" carbon from the carbonaceous refuse product of oil gas manufacture for subsequent uses in the electrical art, which consists in first eliminating therefrom by washing the tar contained therein, and thence by roasting removing the volatile hydrocarbons, and finally reducing the resultant product to a powdered form.

2. The method of recovering the so-called "lamp black" carbon from the carbonaceous refuse product of oil gas manufacture for subsequent uses in the electrical art, which consists in eliminating from the material by washing and roasting the impurities contained therein, and thence reducing the resultant product to a comminuted form.

3. The method of recovering so-called "lamp black" carbon from the carbonaceous refuse product of oil gas manufacture for subsequent uses in the electrical art, which consists in first eliminating from the material by washing and drying the impurities contained therein, and thence reducing the resulting dry product to a finely divided condition.

4. The method of recovering so-called "lamp black" carbon from oil which consists in cracking the oil under a high temperature, collecting the carbonaceous deposits therefrom, eliminating foreign impurities from the carbonaceous refuse, and thence reducing the resultant product to a powdered form.

5. An article of manufacture, the same comprising carbon produced from the carbonaceous refuse product of oil gas manufacture having the volatile and foreign ingredients removed therefrom.

In testimony whereof I have signed my name to this specification in the presence of two subscribing witnesses.

ROBERT D. PIKE.

Witnesses:
LULU E. MANNING,
GEO. D. ABBOTT.